United States Patent
Lu et al.

(10) Patent No.: US 12,111,398 B2
(45) Date of Patent: Oct. 8, 2024

(54) LiDAR AND AMBIENCE SIGNAL FUSION IN LIDAR RECEIVER

(71) Applicant: BEIJING VOYAGER TECHNOLOGY CO., LTD., Beijing (CN)

(72) Inventors: Yue Lu, Los Gatos, CA (US); Youmin Wang, Berkeley, CA (US)

(73) Assignee: BEIJING VOYAGER TECHNOLOGY CO., LTD., Beijing (CN)

( * ) Notice: Subject to any disclaimer, the term of this patent is extended or adjusted under 35 U.S.C. 154(b) by 292 days.

(21) Appl. No.: 17/693,713

(22) Filed: Mar. 14, 2022

(65) Prior Publication Data

US 2023/0176219 A1 Jun. 8, 2023

Related U.S. Application Data

(63) Continuation-in-part of application No. 17/544,923, filed on Dec. 7, 2021, and a continuation-in-part of application No. 17/544,925, filed on Dec. 7, 2021.

(51) Int. Cl.
*G01S 17/89* (2020.01)
*G01S 7/481* (2006.01)

(52) U.S. Cl.
CPC ............ *G01S 17/89* (2013.01); *G01S 7/4816* (2013.01); *G01S 7/4817* (2013.01)

(58) Field of Classification Search
CPC ..... G01S 17/89; G02B 26/02; G02B 26/0833; B81B 2201/042
See application file for complete search history.

(56) References Cited

PUBLICATIONS

Gyu Ho Lee, "Ambient Environment Recognition Algorithm Fusing Vision and LiDAR Sensors for Robust Multi-channel V2X System", 2019 (Year: 2019).*
Jin Fang, "Simulating LIDAR Point Cloud for Autonomous Driving using Real-world Scenes and Traffic Flows", 2018 (Year: 2018).*

* cited by examiner

*Primary Examiner* — Maurice C Smith
(74) *Attorney, Agent, or Firm* — BAYES PLLC

(57) ABSTRACT

Embodiments of the disclosure provide a receiver of an optical sensing system, and an optical sensing method. The receiver includes a micro shutter array configured to sequentially receive a series of laser beams returned from an environment at a plurality of time points. The micro shutter array sequentially opens a portion of the micro shutter array at a specified location at each time point, to allow a respective laser beam to pass through the micro shutter array at that time point and to reflect the ambient light by a remaining portion of the micro shutter array at that time point. The receiver further includes a photodetector configured to detect the laser beam that passes through the micro shutter array at each time point to obtain point cloud data and an image sensor configured to receive the ambient light reflected by the remaining portion of the micro shutter array to obtain image data. The receiver also includes a controller configured to fuse the point cloud data obtained from the photodetector with the image data obtained from the image sensor.

20 Claims, 9 Drawing Sheets

LiDAR AND AMBIENCE SIGNAL FUSION IN LIDAR RECEIVER

CROSS-REFERENCE OF RELATED APPLICATIONS

This is a continuation-in-part of U.S. application Ser. No. 17/544,923 filed Dec. 7, 2021, and also a continuation-in-part of U.S. application Ser. No. 17/544,925 filed Dec. 7, 2021, both of which are incorporated in reference herein in their entireties.

TECHNICAL FIELD

The present disclosure relates to a light detection and ranging (LiDAR) system and more particularly to, a receiver of a LiDAR system that separates laser beams and ambient light returned from the environment using a micro shutter array so as to separately detect the two signals.

BACKGROUND

In a scanning LiDAR system, biaxial architecture has some advantages such as simpler optics, less limitation on a scanner, and a larger aperture which is not limited to the scanner size. One advantage of the biaxial architecture is that the field of view (FOV) of the receiving optics can be quite large to cover all scanned points in the far field. However, if the receiving optics of a LiDAR system is made to be large, in real-world applications, a lot of ambient light, such as light from the direct or indirect sunlight reflected off far-field objects, may be also collected by the receiving optics simultaneously. The larger the receiving optics FOV, the more received ambient light, which means the more noise for backend processing and thus the lower detection accuracy. Therefore, there is a trade-off between the receiving optics FOV that affects the detection range and the signal-to-noise ratio that affects the detection accuracy in existing biaxial scanning LiDAR systems, thereby limiting the performance of the existing biaxial scanning LiDAR systems.

In addition, in the existing biaxial scanning LiDAR systems, the ambient light is generally considered as noise if the ambient light is detected along with the retuned laser beams during optical signal detection. However, the ambient light reflected off far-field objects may itself contain information of the far field, which is useful for object detection. By considering the ambient light as mere noise, the existing biaxial scanning LiDAR systems waste useful information contained in the ambient light, which again limits the performance of the existing biaxial scanning LiDAR systems.

Embodiments of the disclosure address the above problems by separately detecting the laser beams and ambient light returned from the environment, using a micro shutter array, and fusing data from the two sources.

SUMMARY

Embodiments of the disclosure provide an exemplary receiver of an optical sensing system. The receiver includes a micro shutter array configured to sequentially receive a series of laser beams returned from an environment at a plurality of time points. The micro shutter array sequentially opens a portion of the micro shutter array at a specified location at each time point, to allow a respective laser beam to pass through the micro shutter array at that time point and to reflect the ambient light by a remaining portion of the micro shutter array at that time point. The receiver further includes a photodetector configured to detect the laser beam that passes through the micro shutter array at each time point to obtain point cloud data and an image sensor configured to receive the ambient light reflected by the remaining portion of the micro shutter array to obtain image data. The receiver also includes a controller configured to fuse the point cloud data obtained from the photodetector with the image data obtained from the image sensor.

Embodiments of the disclosure also provide an exemplary optical sensing method. The method includes receiving a series of laser beams at a plurality of time points and an ambient light returned from an environment by a micro shutter array disposed along a light path of the series of laser beams returned from the environment. The micro shutter array sequentially opens a portion of the micro shutter array at a specified location at each time point, to allow one of the series of laser beams to pass through the micro shutter array at that time point and to reflect the ambient light by a remaining portion of the micro shutter array at that time point. The method further includes receiving, by a photodetector of the optical sensing system, the series of laser beams passed through sequentially opened portions of the micro shutter array to obtain point cloud data. The method also includes receiving, by an image sensor of the optical sensing system, the ambient light reflected by the micro shutter array to obtain image data. The method additionally includes fusing the point cloud data obtained from the photodetector with the image data obtained from the image sensor.

Embodiments of the disclosure further provide an exemplary controller for optical sensing. The exemplary controller includes a communication interface configured to receive point cloud data from a photodetector and image data from the image sensor. The point cloud data is formed by a series of laser beams returned from an environment that pass through a micro shutter array at a plurality of time points and detected by the photodetector, and the image data is formed by ambient light reflected by the micro shutter array. The controller further includes a processor configured to fuse the point cloud data with the image data.

It is to be understood that both the foregoing general description and the following detailed description are exemplary and explanatory only and are not restrictive of the present disclosure, as claimed.

DETAILED DESCRIPTION

Figure 1:
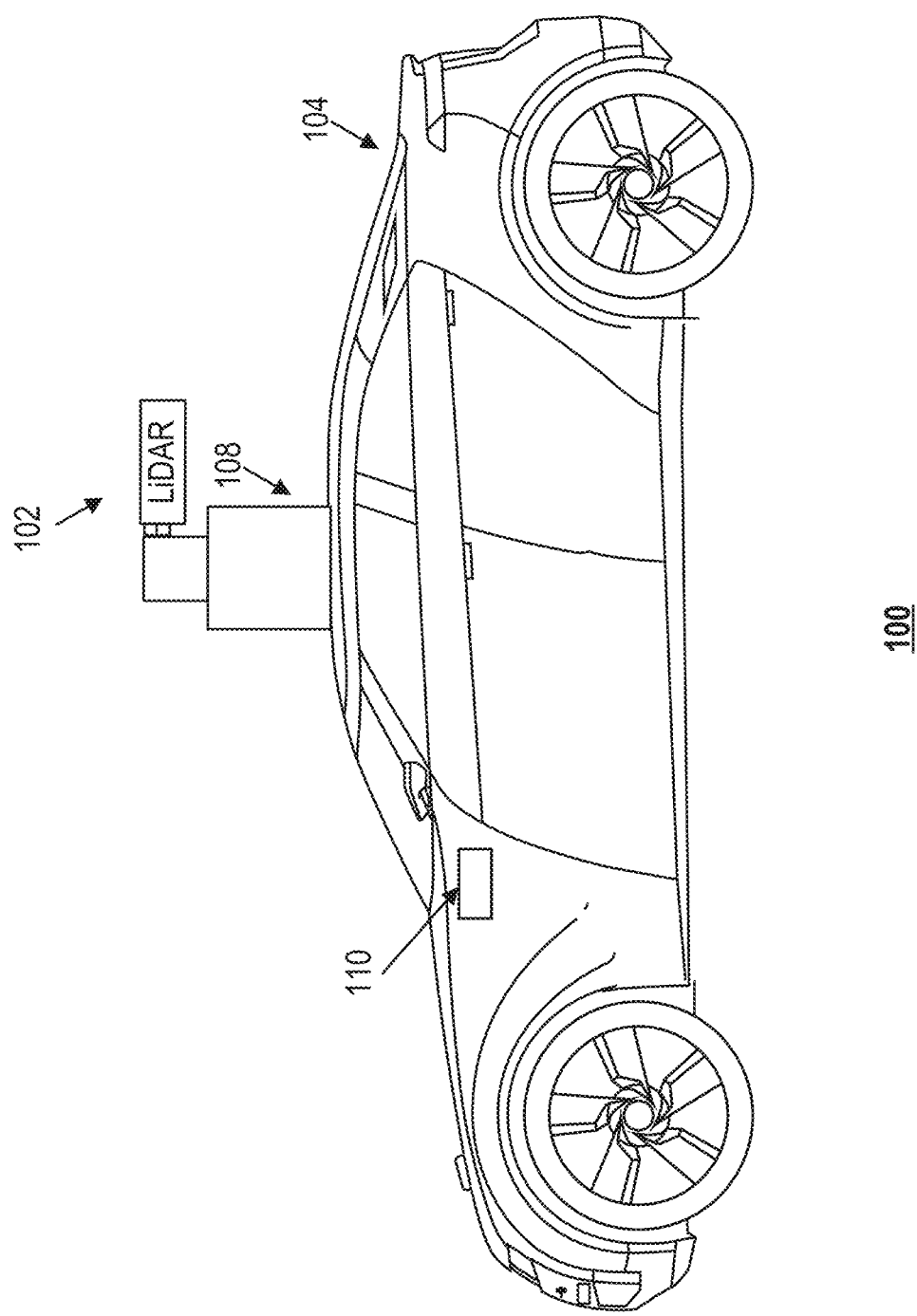
FIG. 1 illustrates a schematic diagram of an exemplary vehicle equipped with a LiDAR system containing a micro shutter array and an image sensor, according to embodiments of the disclosure.

Reference will now be made in detail to the exemplary embodiments, examples of which are illustrated in the accompanying drawings. Wherever possible, the same reference numbers will be used throughout the drawings to refer to the same or like parts.

Embodiments of the present disclosure provide a micro shutter array and an image sensor in a receiver of a biaxial scanning LiDAR system. According to one example, the micro shutter array may be disposed between a receiving lens and a condenser lens of the receiver. The micro shutter array may include a plurality of micro shutter elements arranged in a one-dimensional, two-dimensional, or three-dimensional array, where each micro shutter element may be controlled to switch between an open and closed state. Accordingly, when an optical signal returned from the environment of the LiDAR system is received by the receiver in a biaxial scanning LiDAR system, the micro shutter array may be controlled to allow only a spatially selected portion to be opened, to allow the returned optical signal to pass through the spatially selected portion of the micro shutter array and detected by a photodetector of the receiver.

In some embodiments, the spatially selected portion is selected based on the location where the returned optical signal is incident on the micro shutter array after collimation by the receiving lens, where the incident location of the returned optical signal is also determined by the angular direction at which a scanner of the LiDAR system is pointing during a scanning process. Accordingly, when the scanner of the LiDAR system scans the environment by continuously changing the angular direction, the location where the returned optical signal is incident on the micro shutter array may also continuously change, and the changing pattern may correspond to a pattern that the scanner of the LiDAR system follows during the scanning process. To allow the returned optical signals to pass through the micro shutter array, the micro shutter array may be controlled to sequentially open different portions of the micro shutter array, where each portion is spatially selected based on the location where the returned optical signal is incident on the micro shutter array.

In some embodiments, the micro shutter array may be coated with a reflective material that has a high reflectivity. Accordingly, the micro shutter array reflects signals incident on it unless a certain portion is open. By controlling the micro shutter array to sequentially open only a spatially selected portion at each time point during a scanning process, the majority portion of the micro shutter array remains closed during the scanning process. Therefore, the majority of the ambient light, including the direct or indirect sunlight reflected off far-field objects, may be reflected back without passing through the micro shutter array for detection by the photodetector of the LiDAR system. This then allows the signal-to-ratio to remain high for the photodetector of the LiDAR system, even when the receiving optics FOV is large. That is, the detection range of the disclosed biaxial scanning LiDAR system can be increased without the sacrifice of detection accuracy of the photodetector of the LiDAR system.

In addition, as previously described, the ambient light reflected off far-field objects may contain information regarding these objects, which may be useful for object detection. Accordingly, in some embodiments, the receiver of the disclosed LiDAR system may further include an image sensor (e.g., a camera sensor) that is configured to detect the majority of the ambient light reflected by the micro shutter array in the receiver. To allow the reflected ambient light to deviate from a light path of returning laser beams to be detected by the image sensor disposed off of the light path, the receiver of the disclosed LiDAR system may further include a quarter-wave plate that changes the polarization state of the ambient light passing through the plate and a beam splitter that re-directs the ambient light reflected by the micro shutter array based on the polarization state of the ambient light. The re-directed ambient light may be detected by the image sensor, which may capture the texture information of the environment including the texture information of the far-field objects in the environments. In some embodiments, the texture information of the far-field objects captured by the image sensor may be combined or fused with the depth information of the far-field objects captured by the photodetector of the LiDAR system. The integration of these attributes with an efficient fusion approach may greatly benefit the reliable and consistent perception of the environment surrounding the disclosed LiDAR system.

Other advantages of the disclosed LiDAR system include its easy integration of the receiver into the existing biaxial scanning LiDAR systems, without changing many of the other components, especially the transmitting part included in these LiDAR systems. The features and advantages described herein are not all-inclusive and many additional features and advantages will be apparent to one of ordinary skill in the art in view of the drawings and the following descriptions.

The disclosed LiDAR system containing a micro shutter array and image sensor can be used in many applications. For example, the disclosed LiDAR system can be used in advanced navigation technologies, such as to aid autonomous driving or to generate high-definition maps, in which the optical sensing system can be equipped on a vehicle.

FIG. 1 illustrates a schematic diagram of an exemplary vehicle equipped with an optical sensing system containing a micro shutter array and an image sensor, according to embodiments of the disclosure. Consistent with some embodiments, vehicle 100 may be a survey vehicle configured for acquiring data for constructing a high-definition map or 3-D buildings and city modeling. Vehicle 100 may also be an autonomous driving vehicle.

As illustrated in FIG. 1, vehicle 100 may be equipped with an optical sensing system, e.g., a LiDAR system 102 mounted to a body 104 via a mounting structure 108. Mounting structure 108 may be an electro-mechanical device installed or otherwise attached to body 104 of vehicle 100. In some embodiments of the present disclosure, mounting structure 108 may use screws, adhesives, or another mounting mechanism. Vehicle 100 may be additionally equipped with a sensor 110 inside or outside body 104 using any suitable mounting mechanisms. Sensor 110 may include sensors used in a navigation unit, such as a Global Positioning System (GPS) receiver and one or more Inertial Measurement Unit (IMU) sensors. It is contemplated that the manners in which LiDAR system 102 or sensor 110 can be equipped on vehicle 100 are not limited by the example shown in FIG. 1 and may be modified depending on the types of LiDAR system 102 and sensor 110 and/or vehicle 100 to achieve desirable 3D sensing performance.

Consistent with some embodiments, LiDAR system 102 and sensor 110 may be configured to capture data as vehicle 100 moves along a trajectory. For example, a scanning system of LiDAR system 102 may be configured to scan the surrounding environment. LiDAR system 102 measures distance to a target by illuminating the target with laser beams and measuring the reflected/scattered pulses with a photodetector of the receiver of the LiDAR system. The laser beams used for LiDAR system 102 may be ultraviolet, visible, or near-infrared, and may be pulsed or continuous wave laser beams. In some embodiments of the present disclosure, LiDAR system 102 may capture point cloud data including depth information of the objects in the surrounding environment, which may be used for constructing a high-definition map or 3-D buildings and city modeling. In some embodiments of the present disclosure, LiDAR system 102 may also include an image sensor that captures the texture information of the environment, which may be further fused with the depth information captured by the photodetector of the LiDAR system to get a better perception of the environment surrounding the disclosed LiDAR system. As vehicle 100 moves along the trajectory, LiDAR system 102 may continuously capture data including the depth information and the texture information of the surrounding objects (such as moving vehicles, buildings, road signs, pedestrians, etc.) for map, building, or city modeling construction.

Figure 2:
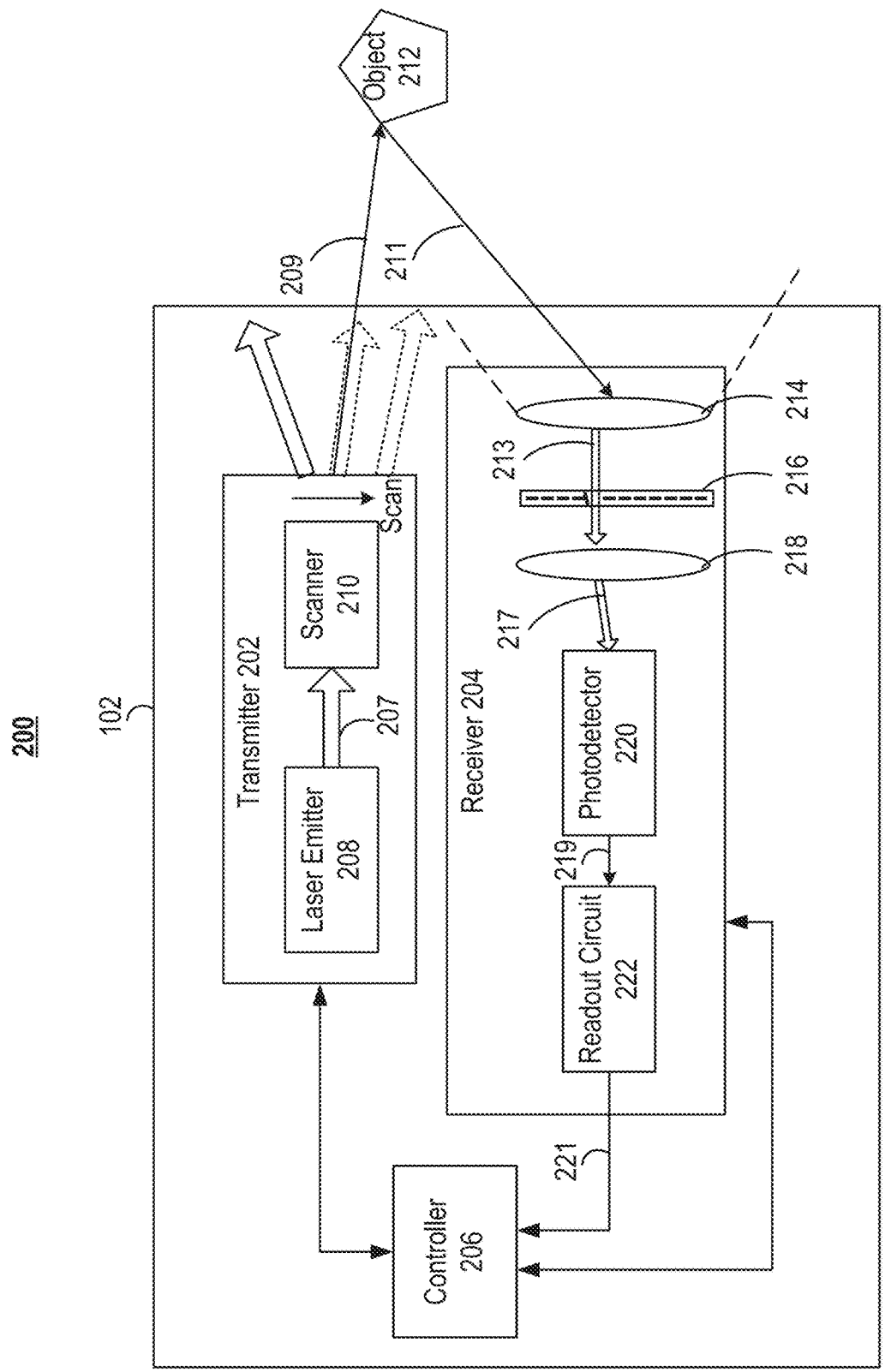
FIG. 2 illustrates a block diagram of an exemplary LiDAR system containing a micro shutter array and an image sensor, according to embodiments of the disclosure.

FIG. 2 illustrates a block diagram of an exemplary LiDAR system containing a micro shutter array and an image sensor, according to embodiments of the disclosure. In some embodiments, LiDAR system 102 may be a biaxial LiDAR, a semi-coaxial LiDAR, a coaxial LiDAR, a scanning flash LiDAR, etc. As illustrated, LiDAR system 102 may include a transmitter 202, a receiver 204, and a controller 206 coupled to transmitter 202 and receiver 204. Transmitter 202 may further include a laser emitter 208 for emitting a laser beam 207, and one or more optics (not shown) for collimating laser beam 207 emitted by laser emitter 208. In some embodiments, transmitter 202 may additionally include a scanner 210 for steering the collimated laser beam according to a certain pattern. Transmitter 202 may emit optical beams (e.g., pulsed laser beams, continuous wave (CW) beams, frequency modulated continuous wave (FMCW) beams) along multiple directions. Receiver 204 may further include a receiving lens 214, a micro shutter array 216, a condenser lens 218, a photodetector 220, and a readout circuit 222. Although not shown, in some embodiments, receiver 204 may further include an image sensor and other optical components, such as a beam splitter, a quarter-wave plate, and a polarizer that collaboratively redirect the ambient light for detection by the image sensor, as described further in detail in FIG. 3.

Laser emitter 208 may be configured to emit laser beams 207 (also referred to as "native laser beams") to scanner 210. For instance, laser emitter 208 may generate laser beams in the ultraviolet, visible, or near-infrared wavelength range, and provide the generated laser beams to scanner 210. In some embodiments of the disclosure, depending on underlying laser technology used for generating laser beams, laser emitter 208 may include one or more of a double heterostructure (DH) laser emitter, a quantum well laser emitter, a quantum cascade laser emitter, an interband cascade (ICL) laser emitter, a separate confinement heterostructure (SCH) laser emitter, a distributed Bragg reflector (DBR) laser emitter, a distributed feedback (DFB) laser emitter, a vertical-cavity surface-emitting laser (VCSEL) emitter, a vertical-external-cavity surface-emitting laser (VECSEL) emitter, an extern-cavity diode laser emitter, etc., or any combination thereof. Depending on the number of laser emitting units in a package, laser emitter 208 may include a single emitter containing a single light-emitting unit, a multi-emitter unit containing multiple single emitters packaged in a single chip, an emitter array or laser diode bar containing multiple (e.g., 10, 20, 30, 40, 50, etc.) single emitters in a single substrate, an emitter stack containing multiple laser diode bars or emitter arrays vertically and/or horizontally built up in a single package, etc., or any combination thereof. Depending on the operating time, laser emitter 208 may include one or more of a pulsed laser diode (PLD), a CW laser diode, a Quasi-CW laser diode, etc., or any combination thereof. Depending on the semiconductor materials of diodes in laser emitter 208, the wavelength of emitted laser beams 207 may be at different values, such as 760 nm, 785 nm, 708 nm, 848 nm, 870 nm, 905 nm, 940 nm, 980 nm, 1064 nm, 1083 nm, 1310 nm, 1370 nm, 1480 nm, 1512 nm, 1550 nm, 1625 nm, 1654 nm, 1877 nm, 1940 nm, 2000 nm, etc. It is understood that any suitable laser source may be used as laser emitter 208 for emitting laser beams 207 at a proper wavelength.

Scanner 210 may include various optical elements such as prisms, mirrors, gratings, optical phased array (e.g., liquid crystal-controlled grating), or any combination thereof. When a laser beam is emitted by laser emitter 208, scanner 210 may direct the emitter laser beam towards the environment, e.g., object(s) 212, surrounding LiDAR system 102. In some embodiments, object(s) 212 may be made of a wide range of materials including, for example, non-metallic objects, rocks, rain, chemical compounds, aerosols, clouds, and even single molecules. In some embodiments, at each time point during a scanning process, scanner 210 may direct laser beams 209 to object(s) 212 in a direction within a range of scanning angles by rotating a deflector, such as a micromachined mirror assembly.

Receiver 204 may be configured to detect returned laser beams 211 reflected by object(s) 212. Upon contact, laser light can be reflected/scattered by object(s) 212 via backscattering, such as Raman scattering, and fluorescence. Returned laser beams 211 may be in a same or different direction from laser beams 209. In some embodiments, receiver 204 may collect laser beams returned from object(s) 212 and output signals reflecting the intensity of the returned laser beams. In some embodiments, receiver 204 may be configured to also detect the ambient light reflected off objects in the environment, and thus may capture texture information of the objects in the environment, as further described in detail in FIG. 3.

As described above and as illustrated in FIG. 2, receiver 204 may include a receiving lens 214, a micro shutter array 216, a condenser lens 218, a photodetector 220, and a readout circuit 222. Receiving lens 214 may receive laser beams 211 returned from the environment (e.g., reflected by object(s) 212) and ambient light from the environment, and may collimate the receiving laser beams and ambient light towards micro shutter array 216. Micro shutter array 216 may reflect away the majority of the ambient light from the collimated laser beams 213, to allow only the collimated laser beams and a very limited amount of the ambient light to pass through the micro shutter array. For instance, micro shutter array 216 may open only a very small portion at a position where a returned laser beam is incident on the micro shutter array at each time point, to allow the returned laser beam and a very limited amount of the ambient light, if there is any, to pass through. Condenser lens 218 may be configured to converge and focus a passed-through laser beam on photodetector 220 as a focused spot 217.

Photodetector 220 may be configured to detect the focused laser spot 217. In some embodiments, photodetector 220 may include a single sensor element that continuously detects the focused laser spots passed through micro shutter array 216 and focused by condenser lens 218. In some embodiments, photodetector 220 may be a photosensor array that includes multiple sensor elements. Different focused laser spots 217 may be detected by different sensor elements included in the photosensor array. In some embodiments, a focused laser spot detected by photodetector 220 may be converted into an electrical signal 219 (e.g., a current or a voltage signal). Electrical signal 219 may be an analog signal which is generated when photons are absorbed in a photodiode included in photodetector 220. In some embodiments, photodetector 220 may be a PIN detector, an avalanche photodiode (APD) detector, a single photon avalanche diode (SPAD) detector, a silicon photo multiplier (SiPM) detector, or the like.

Readout circuit 222 may be configured to integrate, amplify, filter, and/or multiplex signal detected by photodetector 220 and transfer the integrated, amplified, filtered, and/or multiplexed signal 221 onto an output port (e.g., controller 206) for readout. In some embodiments, readout circuit 222 may act as an interface between photodetector 220 and a signal processing unit (e.g., controller 206). Depending on the configurations, readout circuit 222 may include one or more of a transimpedance amplifier (TIA), an analog-to-digital converter (ADC), a time-to-digital converter (TDC), or the like.

Controller 206 may be configured to control transmitter 202 and/or receiver 204 to perform detection/sensing operations. For instance, controller 206 may control laser emitter 208 to emit laser beams 207, or control photodetector 220 to detect optical signal returning from the environment. In some embodiments, controller 206 may also control data acquisition and perform data analysis. For instance, controller 206 may collect digitalized signal information from readout circuit 222, determine the depth information of object(s) 212 from LiDAR system 102 according to the travel time of laser beams, and construct a high-definition map or 3-D buildings and city modeling surrounding LiDAR system 102 based on the depth information of object(s) 212. In some embodiments, controller 206 may combine the digitalized signals from a series of laser beams passed through different portions of micro shutter array 216 in constructing a high-definition map or 3-D buildings and city modeling surrounding LiDAR system 102. In some embodiments, controller 206 may further fuse depth information included in the photodetector data with the texture information included in the image sensor data, as further described below in FIGS. 3-9.

Figure 3:
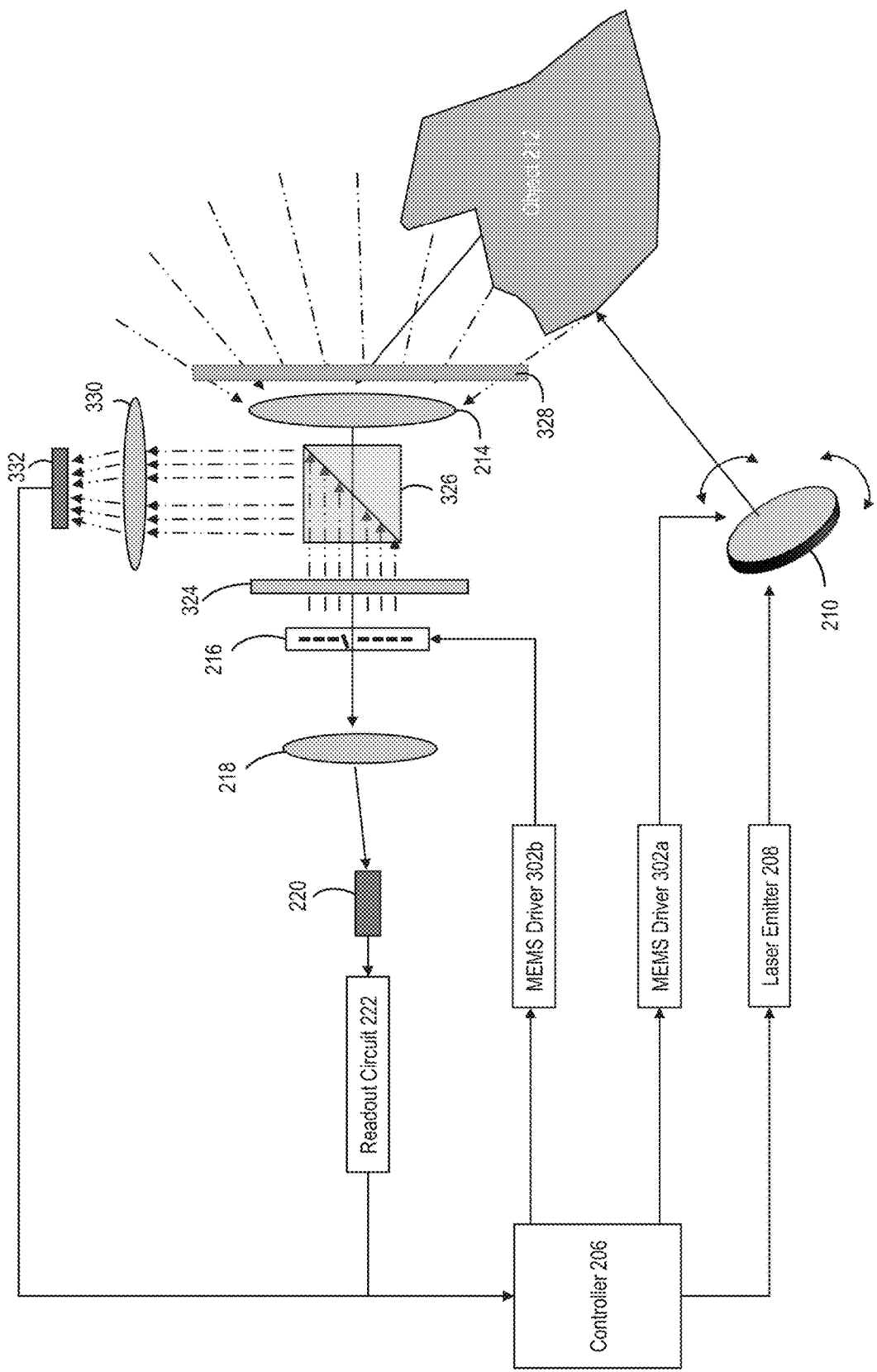
FIG. 3 illustrates a block diagram of another exemplary LiDAR system containing a micro shutter array and an image sensor, according to embodiments of the disclosure.

FIG. 3 illustrates a block diagram of another exemplary LiDAR system 102 containing a micro shutter array and an image sensor, according to embodiments of the disclosure. As illustrated, LiDAR system 102 may include a scanner 210 coupled to a laser emitter 208. In addition, LiDAR system 102 may also include a micro-electromechanical system (MEMS) driver 302a that drives scanner 210 to rotate to achieve a two-dimensional scanning. A controller 206 may provide a control signal to MEMS driver 302a for controlling the rotation of scanner 210 to achieve two-dimensional scanning. For instance, controller 206 may control scanner 210 to steer laser beams emitted by laser emitter 208 towards an object(s) 212, which may be a far-field object surrounding LiDAR system 102.

As illustrated, LiDAR system 102 may further include a receiving lens 214, a condenser lens 218, and a micro shutter array 216 disposed between receiving lens 214 and condenser lens 218. In some embodiments, LiDAR system 102 may further include a MEMS driver 302b coupled to micro shutter array 216, where MEMS driver 302b may drive the micro shutter elements included in micro shutter array 216 to individually open or close according to a predefined pattern, to allow returned laser beams to sequentially pass through the micro shutter array, and to reflect back the ambient light simultaneously collected by the receiving lens 214.

Receiving lens 214 may collimate the optical signals received from the environment. In some embodiments, to improve the detection range of LiDAR system 102, e.g., to detect a building that is 100 m or higher surrounding the LiDAR system, the FOV of receiving lens 214 may be configured to be large. With the increased FOV, when receiving the optical signals from the environment, besides the laser beams reflected from objects (e.g., far-field object(s) 212), receiving lens 214 may also receive a large amount of ambient light from the environment. For instance, direct or indirect sunlight reflected off far-field objects may be also received by receiving lens 214. The larger the FOV of the receiving lens, the more ambient light received from the environment is detected by photodetector 220 of LiDAR system 102. As a result, the detected signal contains more noise, and the detection accuracy is lowered.

Micro shutter array 216 may block the majority of the ambient light from being detected by photodetector 220, and thus increases the detection accuracy of LiDAR system 102 even when the FOV of the receiving lens is large. As illustrated, micro shutter array 216 may be disposed along the light path of the returned optical signals after receiving lens 214. The optical signals, including the returned laser beams and the ambient light, may be collimated and directed by receiving lens 214 towards micro shutter array 216. Micro shutter array 216 may serve as a filter to allow the returned laser beams to pass through while blocking most of the ambient light. To achieve such a filtering effect, micro shutter array 216 may include a plurality of micro shutter elements arranged in a two-dimensional array, where each micro shutter element may include a coated reflective surface facing receiving lens 214. A micro shutter element can be in one of an open state for allowing light and laser beams to pass through or in a closed state for blocking or reflecting back the ambient light or other optical signals. In the closed state, the micro shutter element is covered by the reflective coating such that the laser beam incident on the element will be reflected. In the open state, the reflective coating on the micro shutter element will be temporarily removed, and thus the incident laser beam can pass through. At any moment during a scanning process, the majority of the micro shutter elements may remain closed and thus the majority of the ambient light may be reflected back towards receiving lens 214. Only a spatially selected portion of micro shutter elements may be in an open state for allowing the returned laser beams to pass through the micro shutter array. A very limited portion of the ambient light, if any, may also pass through the spatially selected portion of the micro shutter elements in the open state. The spatial location of the selectively opened portion may correspond to the incident position of the returned laser beam, which may be further determined by the angular direction at which a scanner of the LiDAR system is pointing during a scanning process, as further described in detail in FIG. 4.

As described earlier, the ambient light reflected by micro shutter array 216 may also contain information of the far field, which may be also used for objection detection or environmental sensing of the objects in the far field. Accordingly, the disclosed LiDAR system 102 may further include a set of optical elements and a corresponding image sensor configured to detect the objects in the far field by sensing the ambient light reflected by micro shutter array 216, as shown in FIG. 3. For instance, as illustrated in the figure, the disclosed LiDAR system may include a polarizer 328 for polarizing the ambient light into a linearly polarized light, a beam splitter 326 to allow the linearly polarized light to pass through without changing a direction, and a quarter-wave plate 324 for converting the linearly polarized light into a circularly polarized light before being incident on micro shutter array 216. When the circularly polarized light is incident on micro shutter array 216, while a certain amount of the circularly polarized light may pass through the opened portion of micro shutter array 216 as described above, the majority of the circularly polarized light may be reflected back by the reflective surface of micro shutter array 216. During the reflection, the circularly polarized light may reverse its handedness. In return, the opposite-handedness circularly-polarized light may be converted to the opposite linearly polarized light by quarter-wave plate 324. The opposite linearly polarized light, when passing through the beam splitter 326 again, may be reflected by the beam splitter 326 due to the reversed handedness of the linearly polarized light, and thus change its direction, as shown in FIG. 3. The reflected linearly polarized light may be concentrated or focused by imaging lens 330, and the concentrated or focused light may be then detected by image sensor 332. In some embodiments, the ambient light reflected off objects in the environment may include information of the objects in the environment, which, when captured by image sensor 332, may provide texture information of the objects in the environment.

It is to be noted that components illustrated in FIG. 3 are merely for illustrative purposes, and not for limitation. The arrangement of these components is not limited to the configuration illustrated in FIG. 3, but can be in other configurations. For instance, polarizer 328 may be disposed behind receiving lens 214 along the light path of the returning laser beams. In addition, beam splitter 326 may be in other shapes or structures different from that shown in FIG. 3. In addition, the disclosed LiDAR system may include more or fewer components than those illustrated in FIG. 3 for separate detection of point cloud data and image data simultaneously in a receiver of a LiDAR system. The specific details regarding the separate detection of point cloud data and image data will be described further in FIGS. 4-6.

Figure 4:
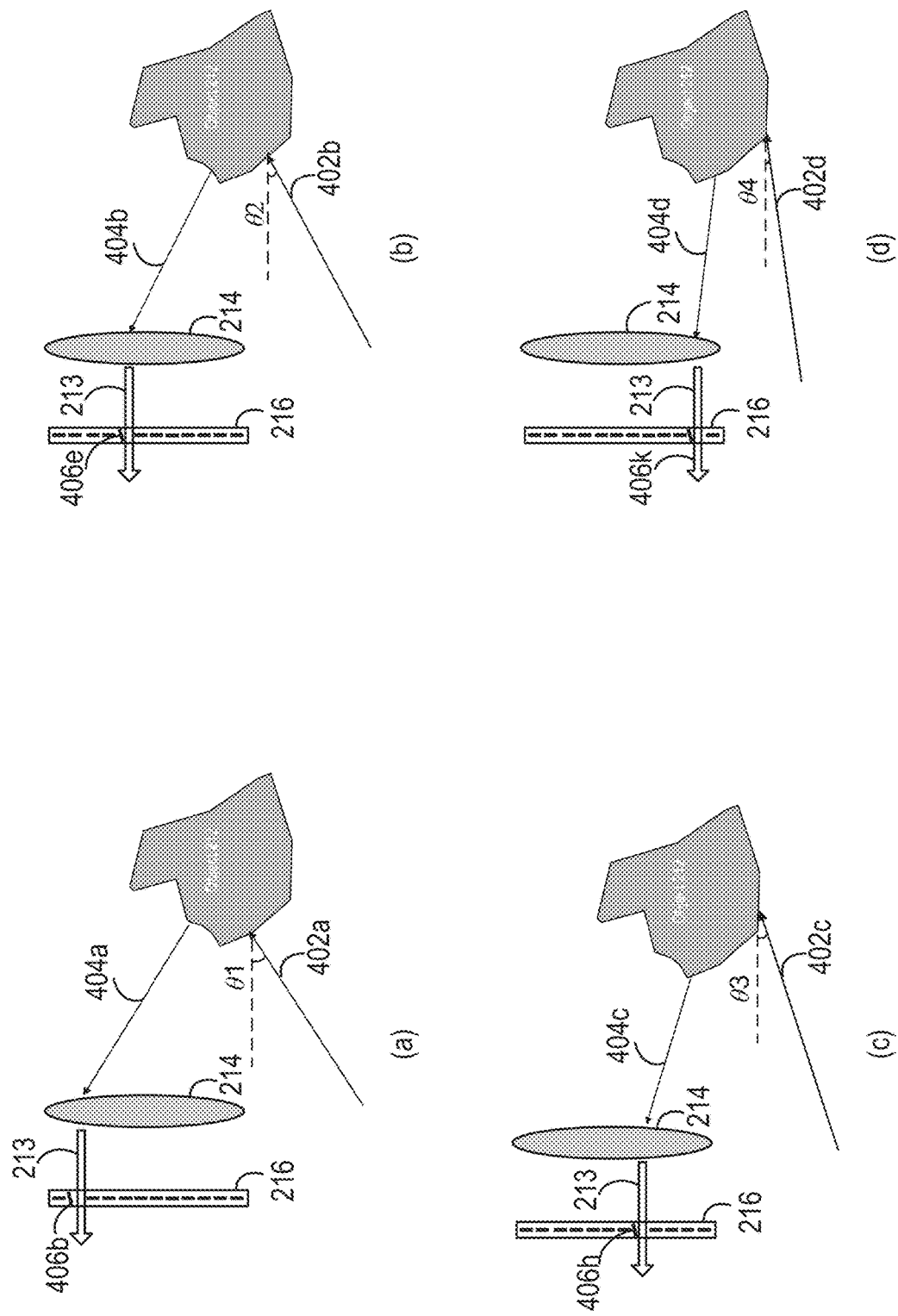
FIG. 4 illustrates a schematic diagram of an exemplary operation of a micro shutter array, according to embodiments of the disclosure.

FIG. 4 illustrates a schematic diagram of an exemplary operation of a micro shutter array 216, according to embodiments of the disclosure. As illustrated, micro shutter array 216 may sit along a light path of the optical signals returning from the environment. The optical signals impinging on receiving lens 214 may be first collimated onto micro shutter array 216, where the optical signals may include both the returned laser beams and the ambient light. A small portion of micro shutter array 216 may be controlled to open only when a returned laser beam is incident on that portion. In one example, as illustrated in parts (a)-(d) in FIG. 4, when returned laser beams are incident at different positions on the micro shutter array at different time points during a scanning process, the micro shutter element(s) corresponding to that position may be controlled to open. The exact position where the returned laser beam is incident on the micro shutter array at each time point may be determined by the angular direction or the incident angle at which the scanner of the LiDAR system is pointing at a far-field object at that time point during the scanning process.

For instance, in part (a) of FIG. 4, at time point t1 of a scanning process, the angular direction (or incident angle) at which the scanner of the LiDAR system is pointing at object(s) 212 is indicated by arrow 402a (or incident angle θ1). The returned laser beam reflected off far-field object(s) 212 is indicated by arrow 404a, which, after collimation by the receiving lens 214, may be incident on the micro shutter array at a position corresponding to a micro shutter element 406b. That is, the angular direction or incident angle θ1 of the laser beam directed by the scanner determines the corresponding position or the exact micro shutter element(s) 406b at which the returned laser beam is incident on the micro shutter array. Similarly, in part (b) of FIG. 4, the angular direction 402b or incident angle θ2 of a laser beam at which the scanner of the LiDAR system is pointing at object(s) 212 determines the returned laser beam 404b and the corresponding micro shutter element 406e at which the returned laser beam is incident on the micro shutter array, in part (c) of FIG. 4, the angular direction 402c or incident angle θ3 of a laser beam at which the scanner of the LiDAR system is pointing at object(s) 212 determines the returned laser beam 404c and the corresponding micro shutter element 406h at which the returned laser beam is incident on the micro shutter array, and in part (d) of FIG. 4, the angular direction 402d or incident angle θ4 of a laser beam at which the scanner of the LiDAR system is pointing at object(s) 212 determines the returned laser beam 404d and the corresponding micro shutter element 406k at which the returned laser beam is incident on the micro shutter array. That is, when the angular direction or the incident angle at which the scanner of the LiDAR system is pointing at a far-field object is determined, the corresponding micro shutter element(s) at which the returned laser beam is incident on the micro shutter array is also determined. Since the angular direction or the incident angle at which the scanner of the LiDAR system is pointing at a far-field object at each time point can be predefined, e.g., by defining the scanning pattern of the scanner of the LiDAR system, the corresponding micro shutter element(s) at which the returned laser beam is incident on the micro shutter array at each time point may be also determined consequentially. That is, a pattern in which the micro shutter elements are controlled to open may match a scanning pattern in which the emitted laser beams are directed towards the environment (e.g., towards far-field objects), as further described in FIG. 5.

Figure 5:
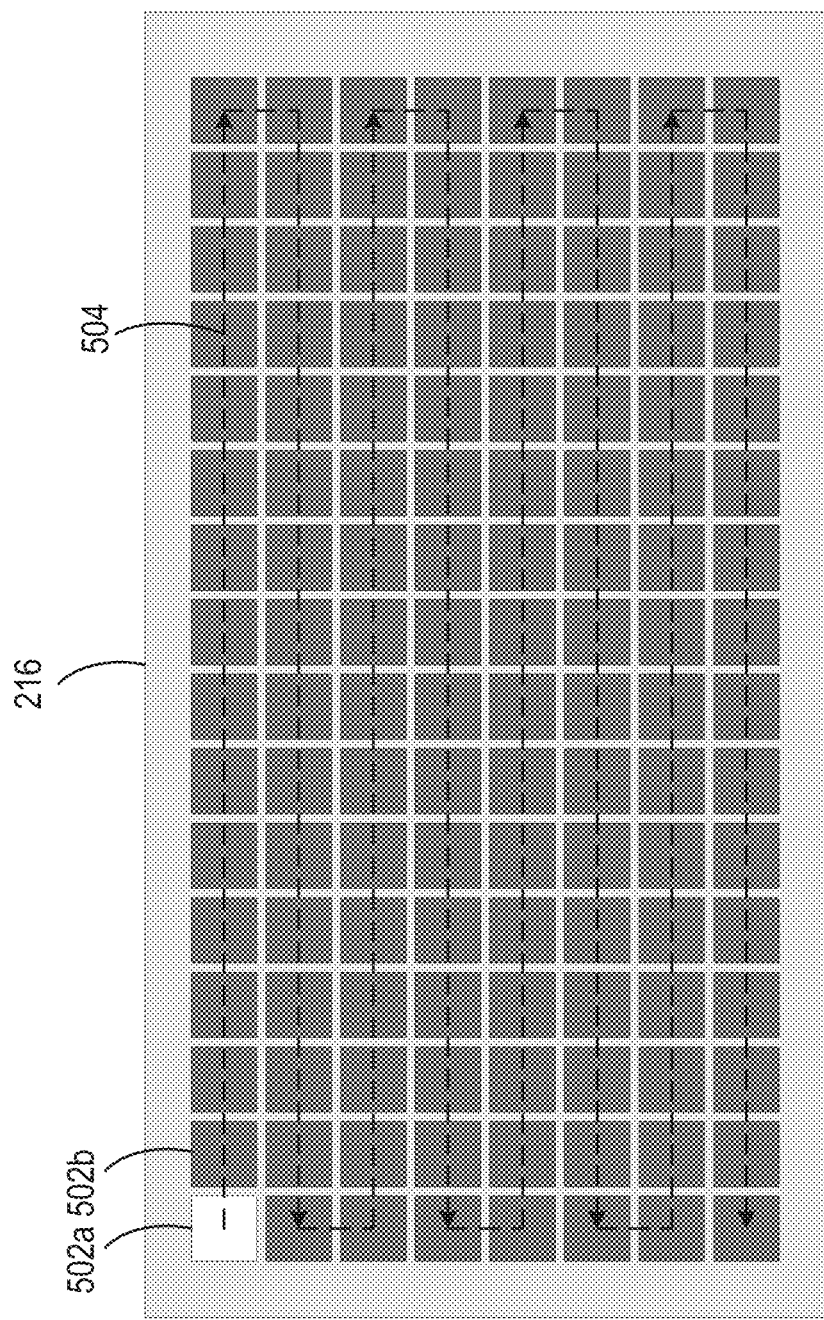
FIG. 5 illustrates a schematic diagram of an exemplary separation of ambient light from returned laser beams, according to embodiments of the disclosure.

FIG. 5 illustrates a schematic diagram of an exemplary view of sequentially opened micro shutter elements in a micro shutter array, according to embodiments of the disclosure. As illustrated, at one time point during a scanning process, a micro shutter element 502a may be controlled to open since the returned laser beam is incident right on the micro shutter element 502a. As the scanner continuously scans following a predefined pattern (e.g., a two-dimensional scanning pattern with the horizontal scanning as a fast axis and the vertical scanning as a slow axis), the micro shutter element that is controlled to open may continue to shift from micro shutter element 502a along a direction as indicated by the arrowed dotted line 504. For instance, at a next time point of the scanning process, micro shutter element 502b is controlled to open. Meanwhile, micro shutter element 502a is controlled to close at that time point. That is, at each time point, only micro shutter element(s) corresponding to the incident returned laser beam is controlled to open, while the remaining micro shutter elements in the micro shutter array remain closed. Therefore, during the scanning process, the micro shutter elements in the micro shutter array are controlled to open sequentially, following a pattern matching the scanning pattern that the scanner follows. If the scanner of the LiDAR system follows a different scanning pattern (e.g., a two-dimensional scanning pattern with the horizontal scanning as a slow axis and the vertical scanning as a fast axis, or a one-dimensional scanning pattern), the pattern in which the micro shutter elements are controlled to sequentially open may also be changed accordingly. In this way, it can be ensured that only the portion of the micro shutter array corresponding to the returned laser beam be controlled to open at any given time point while all other micro shutter elements remain closed. This then blocks most of the ambient light without affecting the detection of the returned laser beams during a scanning process by the LiDAR system, thereby separating the majority of the ambient light from the returned laser beams. This allows the ambient light and the returned laser beams to be separately detected in a same receiver of the LiDAR system, as further described in detail in FIG. 6.

Figure 6:
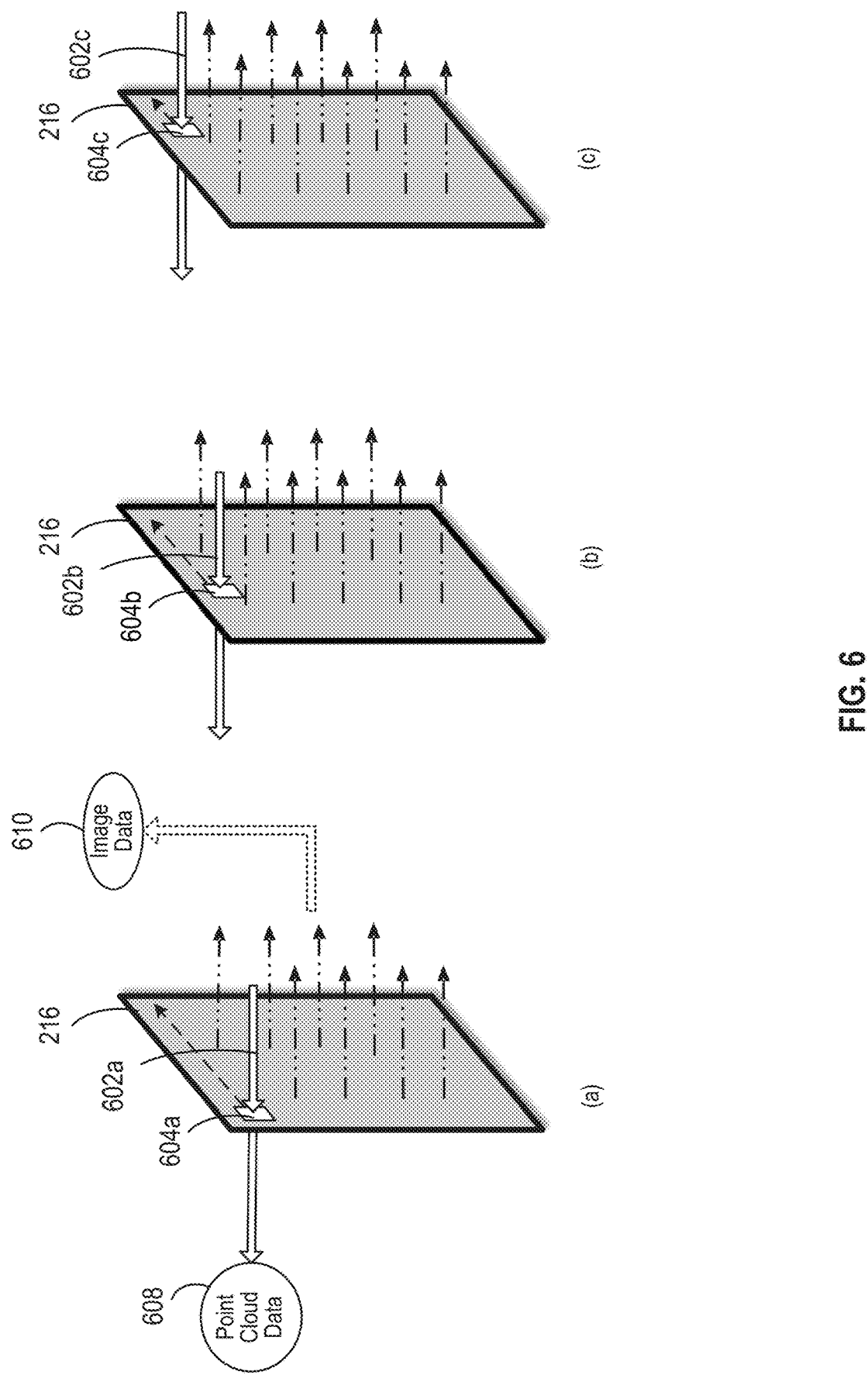
FIG. 6 illustrates a schematic diagram of an exemplary fusion of image data and point cloud data, according to embodiments of the present disclosure.

FIG. 6 illustrates a schematic diagram of an exemplary separation of ambient light for image data and returned laser beams for point cloud data by a micro shutter array 216, according to embodiments of the disclosure. As described above, when a returned laser beam is incident on micro shutter array 216, the corresponding portion of micro shutter array 216 may be controlled to open, to allow the returned laser beam to pass through micro shutter array 216. For instance, in part (a) of FIG. 6, a returned laser beam 602a may be incident on micro shutter array 216 at one time point during a scanning process. At that time point, a portion 604a of micro shutter array 216 corresponding to the incident location of returned laser beam 602a may be controlled to open, to allow returned laser beam 602a to pass through micro shutter array 216. In some embodiments, the size of the opened portion 604a may be equivalent to or larger than the size of returned laser beam 602a so that returned laser beam 602a passes through micro shutter array 216 without an optical loss. When the scanning process continues, the returned laser beam keeps changing the incident position on micro shutter array 216 due to the changing scanning direction. For instance, at a subsequent time point, a returned laser beam 602b may be incident on a location corresponding to a portion 604b of micro shutter array 216. The portion 604b of micro shutter array 216 may be then controlled to open at that time point, to allow returned laser beam 602b to pass through portion 604b of micro shutter array 216, as shown in part (b) of FIG. 6. Part (c) of FIG. 6 shows an even later time point during a scanning process, at which a returned laser beam 602c may be incident on micro shutter array 216 at a location corresponding to a portion 604c of micro shutter array 216, which is controlled to open to allow returned laser beam 602c to pass through micro shutter array 216 when returned laser beam 602c is incident on micro shutter array 216. Accordingly, through controlling spatially selected portions of micro shutter array 216 to open sequentially, the returned laser beams may be controlled to pass through micro shutter array 216, to be detected by photodetector 220 without an optical loss. The returned laser beams detected by photodetector 220 may be used for the construction of point cloud data for the environment during the scanning process, e.g., for determining the depth information of objects in the environment.

As previously described, when returned laser beam 602a, 602b, or 602c is incident on micro shutter array 216, the received ambient light may be also incident on micro shutter array 216. Different from returned laser beams that consistently change incident locations on micro shutter array 216, the received ambient light remains incident on the entire area of micro shutter array 216 during a scanning process. Therefore, the received ambient light covers a much larger area than returned laser beams when being incident on micro shutter array 216. Accordingly, at any time point during a scanning process, since only a portion of micro shutter array 216 corresponding to the incident location of a returned laser beam is controlled to open, only a tiny portion of the received ambient light passes through micro shutter array 216, and the majority of the received ambient light will be reflected back, as shown in FIG. 6. For instance, in part (a) of FIG. 6, only a small portion of the received ambient light will pass through portion 604a of micro shutter array 216 at one time point during a scanning process. Similarly, in parts (b) and (c) of FIG. 6, only a small portion of the received ambient light will pass through portion 604b or 604c respectively at one time during a scanning process, and the majority of the received ambient light will not pass through micro shutter array 216, but rather be reflected back by micro shutter array 216, e.g., by the coated reflective surface of micro shutter elements included in micro shutter array 216. The reflected ambient light may be eventually redirected by beam splitter 326 and further detected by image sensor 332, as described earlier in FIG. 3. The image sensor 332 may thus acquire image data 608 including the texture information of the objects in the environment surrounding the LiDAR system. The image data 608 may be used alone or may be fused with point cloud data 610 in the detection of the objects, as further described in detail in connection with FIGS. 7-8.

Figure 7:
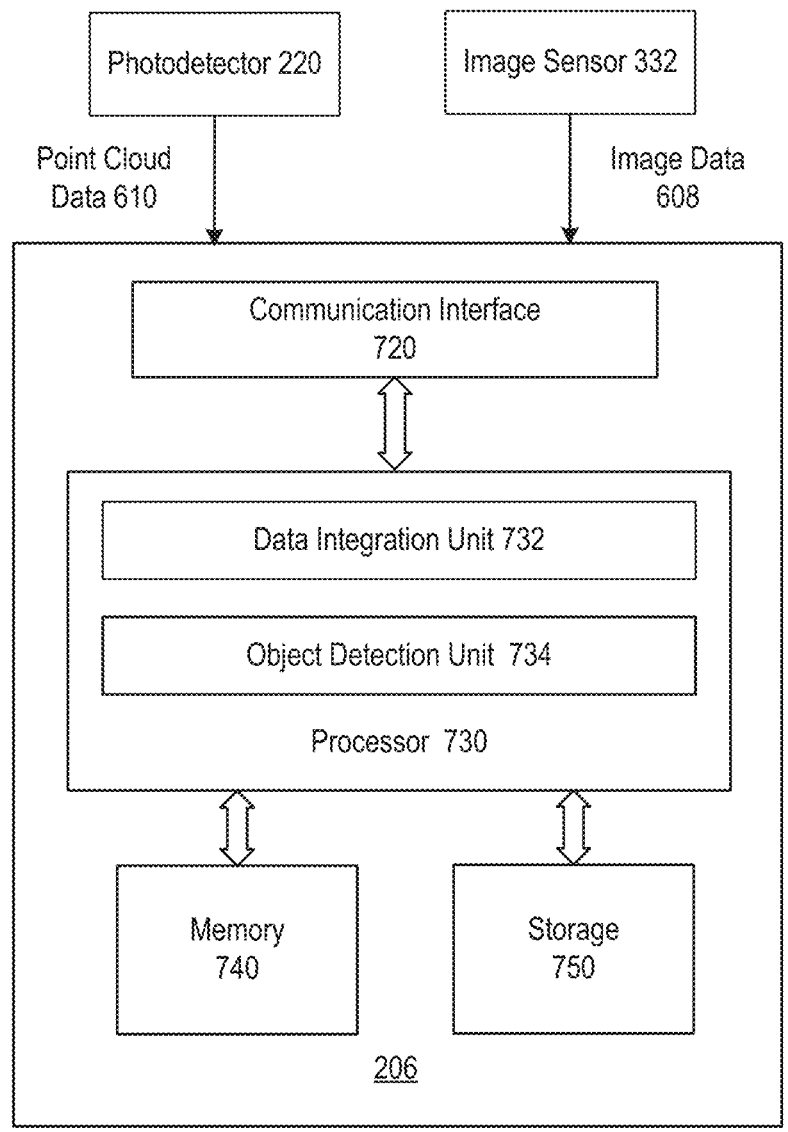
FIG. 7 illustrates a block diagram of an exemplary controller for performing fusion of point cloud data and image data in a LiDAR system, according to embodiments of the disclosure.

FIG. 7 illustrates a block diagram of an exemplary controller 206 for performing fusion of point cloud data and image data in a LiDAR system, according to embodiments of the disclosure. Consistent with the present disclosure, controller 206 may receive point cloud data 610 from photodetector 220 and image data 608 from image sensor 332.

In some embodiments, as shown in FIG. 7, controller 252 may include a communication interface 720, a processor 730, a memory 740, and a storage 750. In some embodiments, controller 206 may have different modules in a single device, such as an integrated circuit (IC) chip (implemented as, for example, an application-specific integrated circuit (ASIC) or a field-programmable gate array (FPGA)), or separate devices with dedicated functions. In some embodiments, one or more components of controller 206 may be located in a cloud, or may be alternatively in a single location (such as inside LiDAR system 200) or distributed locations. Components of controller 206 may be in an integrated device, or distributed at different locations but communicate with each other through a network.

Communication interface 720 may send data to and receive data from components such as photosensor 216 via wired communication methods, such as Serializer/Deserializer (SerDes), Low-voltage differential signaling (LVDS), Serial Peripheral Interface (SPI), etc. In some embodiments, communication interface 720 may optionally use wireless communication methods, such as a Wireless Local Area Network (WLAN), a Wide Area Network (WAN), wireless communication links such as radio waves, a cellular network, and/or a local or short-range wireless network (e.g., Bluetooth™), etc. Communication interface 720 can send and receive electrical, electromagnetic or optical signals that carry digital data streams representing various types of information.

Consistent with some embodiments, communication interface 720 may receive point cloud data 610 and image data 608. Image data 608 may be obtained by image sensor 332 based on the ambient light reflected from the environment and further reflected by micro shutter array 216, while point cloud data may be obtained by photodetector 220 based on the returned laser beams passed through micro shutter array 216, as previously described. In some embodiments, communication interface 720 may sequentially receive point cloud data 610 and image data 608 as scanner 210 continues to scan laser beams 209 at various time points. For example, communication interface 720 may receive point cloud data 610 as photodetector 220 sequentially detects laser beams returned from the environment and pass through micro shutter array 216. In some other embodiments, communication interface 720 may receive point cloud data 610 and image data 608 collectively after completion of a scan. Communication interface 228 may transmit the received point cloud data 610 and image data 608 to processor 730 for processing.

Processor 730 may include any appropriate type of general-purpose or special-purpose microprocessor, digital signal processor, or microcontroller. Processor 730 may be configured as a stand-alone processor module dedicated to analyzing data (e.g., point cloud data 610 and image data 608) and/or controlling the scan schemes. Alternatively, processor 730 may be configured as a shared processor module for performing other functions.

As shown in FIG. 7, processor 730 may include multiple functional units or modules that can be implemented using software, hardware, middleware, firmware, or any combination thereof. For example, processor 730 may include a data integration unit 732 and an object detection unit 734, or the like. Units 732 and 734 can be hardware units (e.g., portions of an integrated circuit) of processor 730 designed for operation independently or with other components or software units implemented by processor 730 through executing at least part of a program. The program may be stored on a computer-readable medium. When the program is executed by processor 730, the executed program may cause processor 730 to perform one or more functions or operations. Although FIG. 2B shows units 732-734 within one processor 730, it is contemplated that these units may be distributed among multiple processors located close to or remotely with each other. The functions of units 732-734 are described in greater detail as follows in connection with FIG. 8.

Figure 8:
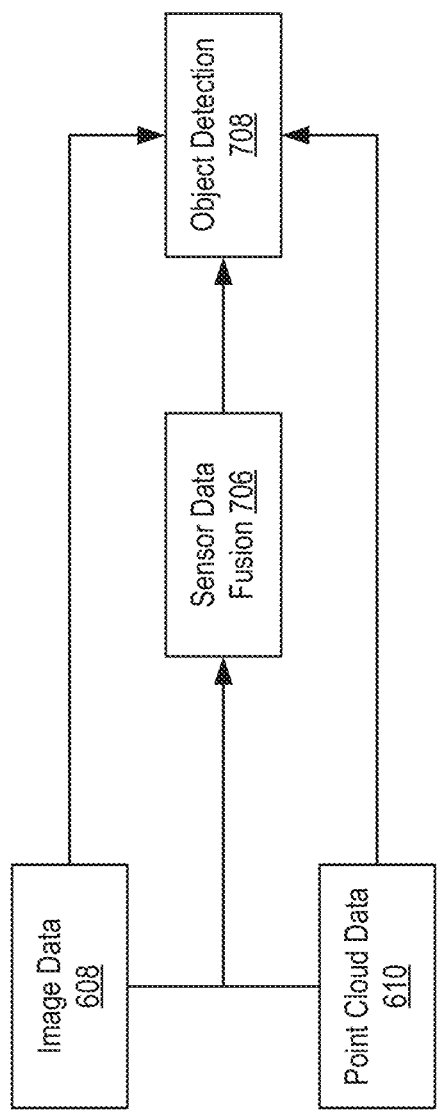
FIG. 8 is a schematic diagram of an exemplary fusion of point cloud data and image data, according to embodiments of the disclosure.

FIG. 8 is a schematic diagram of an exemplary fusion of point cloud data from photodetector 220 and image data from image sensor 332, according to embodiments of the disclosure. As illustrated, image data 608 and point cloud data 610 may be used for sensor data fusion 706 and object detection 708. In some embodiments, may be configured to perform sensor data fusion 706 and object detection unit 734 may be configured to perform object detection 708.

As previously described, while image data 608 and point cloud data 610 both provide information for object detection, LiDAR point cloud data is generally rich in depth information but lacking color and data integration unit 732 texture information, while image sensor data provides more detailed texture, color and lighting information in the form of images or videos but lacking depth information. Accordingly, data integration unit 732 may combine or integrate the data from the two sources, so as to combine the unique qualities of respective modalities included in the receiver of the disclosed LiDAR system, for object detection unit 734 to achieve simultaneous objection detection and localization.

In some embodiments, different fusion techniques may be applied, including early fusion, late fusion, or combined fusion by using different neural networks. In some embodiments, the fusion may be implemented in an early stage, e.g., raw data may be fused (therefore referred to as "early fusion"). That is, data integration unit 732 may combine or integrate image data 608 from image sensor 332 and point cloud data 610 from photodetector 220 first, and the integrated data is used by object detection unit 734 for detecting an object in the environment that is captured by both the point cloud data and the image data.

In some embodiments, the ambient light reflected from the micro shutter array at each time point may exclude a portion of the ambient light that has passed through micro shutter array 216. Accordingly, image data 608 obtained from the ambient light reflected by micro shutter array 216 at one time point may include a missing portion. To compensate for the missing portion, image data 608 obtained from the ambient light reflected by micro shutter array 216 at a different time point during a scanning process, e.g., a time point right before or after that time point, may be used, and the corresponding missing portion may be obtained based on the image overlay and intensity detection of the overlaid image since a missing portion may show a lower intensity than the remaining part of the overlaid image.

Alternatively or additionally, the missing portion of the image data 608 may be compensated based on the optical signal detected by photodetector 220. For instance, the portion of the ambient light that has passed through micro shutter array 216 may be detected by photodetector 220, which may be further separated from a returned laser beam simultaneously detected by photodetector 220 due to the different wavelength. The separated optical signal may be then combined or fused with image data 608 obtained by image sensor 322, to get an integrated image data that corresponds to the whole FOV of receiving lens 214 (that is, without a missing portion) in LiDAR system 102. Specifically, to integrate the point cloud data and the image data, data integration unit 732 may align the image frames in image data 608 with the data points in point cloud data 610 at the respective time points. For example, for a specific time point, data integration unit 732 may determine the specific location of the portion of the micro shutter array that opens at that time point, and then identify a pixel corresponding to that specific location in the image frame of that time point. Data integration unit 732 then determines an intensity value of the pixel based on the data point in the point cloud data corresponding to the same time point.

In some embodiments, data integration may take the form of augmenting one data with supplemental information carried by the other data. For example, data integration unit 732 may augment point cloud data 610 with corresponding RGB values obtained from image data 608 for later processing by a neural network.

Object detection unit 734 may perform various point data processing methods to detect an object in the point clouds. For instance, different non-neural or neural network approaches may be employed to detect objects from image data 608 and/or point cloud data 610. The non-neural network approaches may include, but are not limited to, Viola-jones object detection framework based on Haar features, scale-invariant feature transform, ad histogram, of oriented gradients features. The neural network-based approaches may include, but are not limited to, Region Proposals (Regions with Convolutional Neural Networks (R-CNN), Fast R-CNN, Faster R-CNN, cascade R-CNN), Single Shot MultiBox Detector (SSD), You Only Look Once (YOLO), Single-Shot Refinement Neural Network for Object Detection (RefineDet), Retina-Net, deformable convolutional networks.

The data fusion and subsequent object detection may allow a more reliable and consistent perception of the environment surrounding the disclosed LiDAR system, which is a crucial process in many applications that requires a LiDAR system, such as in autonomous driving, industrial automation, and robotics.

On the other hand, in some other embodiments, the data fusion may be at a later stage after object detections using the respective data to fuse the results from the independent or separate detections (therefore referred to as "late fusion"). For example, object detection unit 734 may perform a first perception (e.g., object detection) on the point cloud data for detecting an object in the environment and perform a second perception on the image data for detecting the object. Then data integration unit 732 fuses the first perception and the second perception to detect the object.

For object detection 708 using image data 608, object detection unit 734 may perform image classification and/or object localization. Similarly, for object detection using point cloud data 610, photodetector 220 may produce point clouds that map the environment in 3D, as previously described. This "cloud," consisting of distance points, may provide numerous and valuable environmental information including the depth information of the detected objects.

Data integration unit 732 then integrates the detection results from image data 608 and point cloud data 610 to form a fused detection result. In some embodiments, integration may take the form of projecting detection result obtained from one type of data to the detection result obtained from the other type of data. As one example, data integration unit 732 may project 2D bounding boxes from the image data 608 into 3D bounding boxes, and then fuse the 3D bounding boxes with the bounding boxes obtained from the point cloud data. As an alternative example, data integration unit 732 may project 3D LiDAR point cloud data onto the 2D image data, to check whether the detected object from the point cloud data falls within 2D bounding boxes detected from the image data.

In some other embodiments, integration may involve neural network processing. For example, higher dimensional features from individual sensor encoder networks may be combined into a joint feature vector, which may be then used by an object detector network to predict object detection parameters. data integration may take the form of reducing dimensionality of one data and using that dimension-reduced data to check against the other data to improve object detection accuracy.

Memory 740 and storage 750 may include any appropriate type of mass storage provided to store any type of information that processor 730 may need to operate. Memory 740 and/or storage 750 may be volatile or non-volatile, magnetic, semiconductor-based, tape-based, optical, removable, non-removable, or other type of storage device or tangible (i.e., non-transitory) computer-readable medium including, but not limited to, a ROM, a flash memory, a dynamic RAM, a static RAM, a hard disk, an SSD, an optical disk, etc. Memory 740 and/or storage 750 may be configured to store one or more computer programs that may be executed by processor 730 to perform functions disclosed herein. For example, memory 740 and/or storage 750 may be configured to store program(s) that may be executed by processor 730 to fuse the image data and the point cloud data and otherwise analyze LiDAR signals.

Memory 740 and/or storage 750 may be further configured to store/cache information and data received and/or used by processor 730. For instance, memory 740 and/or storage 750 may be configured to store/cache point cloud data 610 received from photodetector 220, image data 608 received from image sensor 332, and calculation results obtained by different units of processor 730, such as integrated data. The various types of data may be stored permanently, removed periodically, or disregarded immediately after each frame of data is processed.

It is to be noted that the foregoing fusions are merely some examples for fusing image data 608 with point cloud data 610. In real applications, many different fusion techniques may be applied to fuse image data with the point cloud data. Although in the described embodiments, sensor data fusion 706 is performed locally in controller 206 of the LiDAR system, it is contemplated that sensor data fusion 706 may be alternatively performed remotely in a centralized server, to minimize the computation cost required for a local LiDAR system.

Figure 9:
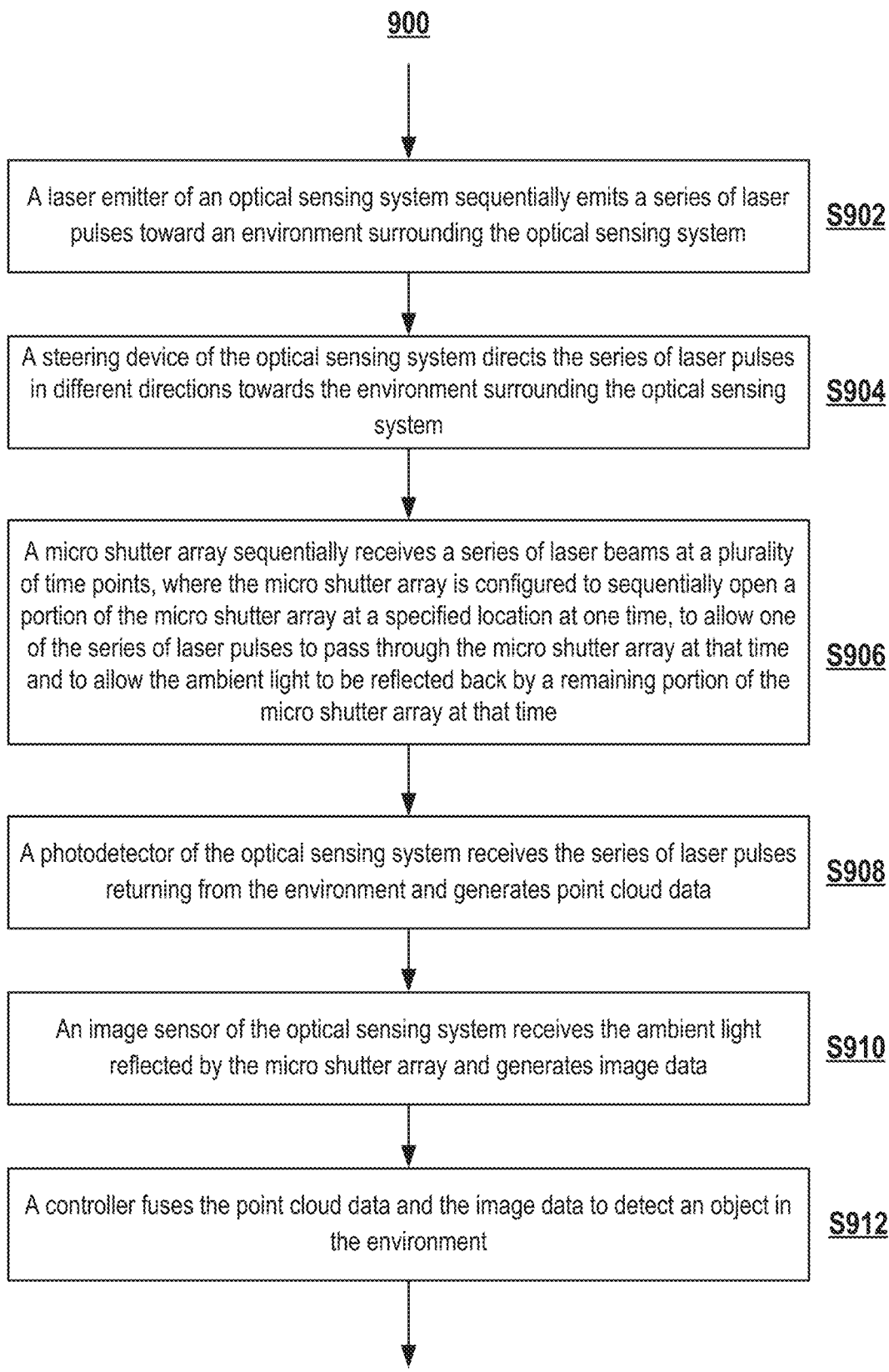
FIG. 9 is a flow chart of an exemplary optical sensing method of a LiDAR system containing a micro shutter array and an image sensor, according to embodiments of the disclosure.

FIG. 9 is a flow chart of an exemplary optical sensing method 900 of a LiDAR system containing a micro shutter array and an image sensor, according to embodiments of the disclosure. In some embodiments, method 900 may be performed by various components of LiDAR system 102, e.g., receiver 204 containing micro shutter array 216 and an image sensor 332, and/or controller 206. In some embodiments, method 900 may include steps S902-S912. It is to be appreciated that some of the steps may be optional. Further, some of the steps may be performed simultaneously, or in a different order than that shown in FIG. 9.

In step S902, an optical source (e.g., laser emitter 208) inside a transmitter of an optical sensing system (e.g., transmitter 202 of LiDAR system 102) may emit a series of laser beams for optical sensing of the environment. Here, the laser beams emitted by the optical source may have a predetermined beam size and divergence. In some embodiments, the emitted laser beams may have a high intensity and a large divergence, to allow detection of the objects in a wide range.

In step S904, a steering device of the optical sensing system (e.g., scanner 210 in transmitter 202 of LiDAR system 102) may steer the emitted laser beams toward the environment surrounding the optical sensing system. The steering device may steer the emitted laser beams according to a predefined pattern, so that different parts of the environment may be scanned over a short period of time. For instance, the emitted laser beams may be directed toward far-field objects in the environment according to a two-dimensional scanning pattern. The objects in the environment may then reflect at least a portion of the laser beams toward the optical sensing system. In some embodiments, the optical sensing system may be a biaxial LiDAR system and thus the returned laser beams may be directly directed towards a receiving lens (e.g., receiving lens 214) of the optical sensing system without being reflected by the steering device. The receiving lens may collimate the received laser beams. In some embodiments, to increase the detection range, the receiving lens FOV may be large. Therefore, a certain amount of ambient light may be also received by the receiving lens. The received ambient light may be also collimated by the receiving lens.

In step S906, a micro shutter array (e.g., micro shutter array 216) disposed after the receiving lens may receive the series of laser beams collimated by the receiving lens, where the micro shutter array may sequentially open a portion of the micro shutter array at a specified location at one time, to allow the corresponding laser beam to pass through the micro shutter array at that time and to reflect the ambient light by a remaining portion of the micro shutter array at that time. As previously described, the micro shutter array may include a plurality of micro shutter elements, where each of the plurality of micro shutter elements may be in one of an open or closed state, and may include a reflective surface that reflects the ambient light if the micro shutter element is in the closed state. To allow the series of laser beams to pass through the micro shutter array, different portions of the micro shutter array may be sequentially opened, where each opened portion may allow a corresponding returned laser beam to pass through. The exact position at which a portion of the micro shutter array to be opened corresponds to an incident location of a returned laser beam on the micro shutter array. Since the returned series of laser beams follow a two-dimensional scanning pattern when the signals are incident on the micro shutter array, the multiple portions included in the micro shutter array may be also controlled to open sequentially following a two-dimensional scanning pattern, to allow each returned laser beam to pass through the corresponding opened portion of the micro shutter array.

As described above, when receiving the returned laser beams, the receiving lens may also receive the ambient light (unless specified, a laser beam throughout the specification may mean a laser light or a laser beam other than the ambient light). The received ambient light may be also collimated towards the micro shutter array. However, different from the returned laser beams that are incident only on a very small portion of the micro shutter array, the received ambient light may be incident on a much larger area, up to the whole surface of the micro shutter array. Since only a small portion of the micro shutter array is controlled to open at any time point, only a very small portion of the ambient light, if any, may pass through the opened portion of the micro shutter array with the returned laser beam, and the majority of the collimated ambient light is blocked by the remaining majority portion of the micro shutter array that contains the closed micro shutter elements. For instance, the majority of the ambient light is reflected back by the closed micro shutter elements in the micro shutter array.

In step S908, a photodetector (e.g., photodetector 220) of the optical sensing system may receive the series of laser beams sequentially passed through the micro shutter array and generate point cloud data based thereon. The series of laser beams may be sequentially received by the photodetector. When each laser beam is detected by the photodetector, the location information of the corresponding micro shutter element(s) allowing the pass-through of that laser beam is also received and recorded, e.g., by a controller of the optical sensing system. Therefore, after each micro shutter element responsible for the pass-through of the returned laser beams is opened, the laser beams for the receiving lens whole FOV are then detected by the photodetector, which can be then combined to generate point clouds for the whole receiving lens FOV during an optical sensing process. The generated point clouds may have a high accuracy due to the filtering effect of the micro shutter array that blocks the ambient light received by the large FOV receiving lens. The disclosed LiDAR system with a micro shutter array may thus achieve laser beam detection with both a large angular range and a high accuracy during an optical sensing process. The returned laser beams detected by photodetector 220 may be used for the construction of point cloud data for the environment during the scanning process. The point cloud data may contain, among others, depth information of objects in the environment.

In step S910, an image sensor (e.g., a camera sensor such as image sensor 332) of the optical sensing system may receive the majority of the ambient light reflected by the micro shutter array. In some embodiments, the optical sensing system may further include certain optical components that collaboratively redirect the majority of the ambient light reflected by the micro shutter array. Examples of such optical components may include a polarizer 328, a beam splitter 326, a quarter-wave plate 324, and an imaging lens 330. Other different optical components are also possible. Once redirected into the image sensor, the majority of the ambient light may be detected by the image sensor. The received ambient light may be used to form image data that depicts the surrounding environment. The image data may include multiple image frames corresponding to the various time points during the scanning process. The image data may capture, among others, the texture information and color information of the objects in the environment.

In step S912, a controller (e.g., controller 206) fuses the point cloud data and the image data to detect an object in the environment. The controller may be inside optical sensing system (such as controller 206 inside LiDAR system 200) or remote from the optical sensing system (e.g., a server in the cloud or a remote computing device), or distributed. In some embodiments, to overcome certain limitations of each detection method of the point cloud data-based approach or image data-based approach, the obtained image data and the point cloud data may be further fused or integrated into object detection, so that a more reliable and consistent perception of the environment surrounding the optical sensing system may be achieved. In some embodiments, the controller may implement an early-fusion, where the controller first integrates the image data acquired through the majority of the ambient light reflected by the micro shutter array and the point cloud data acquired through the returned laser beams passed through the micro shutter array. Then the controller detects objects using the integrated data. In some other embodiments, the controller may implement a late-fusion, where it first detects objects in the environment based on the image data and the point cloud data, individual. Then the detection results may be integrated, e.g., through projections or using neural network processing.

Although the disclosure is made using a LiDAR system as an example, the disclosed embodiments may be adapted and implemented to other types of optical sensing systems that use receivers to receive laser beams not limited to laser beams. For example, the embodiments may be readily adapted for optical imaging systems or radar detection systems that use electromagnetic waves to scan objects.

Another aspect of the disclosure is directed to a non-transitory computer-readable medium storing instructions which, when executed, cause one or more processors to perform the methods, as discussed above. The computer-readable medium may include volatile or non-volatile, magnetic, semiconductor-based, tape-based, optical, removable, non-removable, or other types of computer-readable medium or computer-readable storage devices. For example, the computer-readable medium may be the storage device or the memory module having the computer instructions stored thereon, as disclosed. In some embodiments, the computer-readable medium may be a disc or a flash drive having the computer instructions stored thereon.

It will be apparent to those skilled in the art that various modifications and variations can be made to the disclosed system and related methods. Other embodiments will be apparent to those skilled in the art from consideration of the specification and practice of the disclosed system and related methods.

It is intended that the specification and examples be considered as exemplary only, with a true scope being indicated by the following claims and their equivalents.

What is claimed is:

1. A receiver for optical sensing, comprising:
   a micro shutter array configured to sequentially receive a series of laser beams returned from an environment at a plurality of time points, wherein the micro shutter array sequentially opens a portion of the micro shutter array at a specified location at each time point, to allow a respective laser beam to pass through the micro shutter array at that time point and to reflect ambient light by a remaining portion of the micro shutter array at that time point;
   a photodetector configured to detect the laser beam that passes through the micro shutter array at each time point to obtain point cloud data;
   an image sensor configured to receive the ambient light reflected by the remaining portion of the micro shutter array to obtain image data; and
   a controller coupled to the photodetector and the image sensor, configured to fuse the point cloud data obtained from the photodetector with the image data obtained from the image sensor.

2. The receiver of claim 1, wherein the receiver further comprises a beam splitter configured to direct the reflected ambient light towards the image sensor of the receiver.

3. The receiver of claim 1, wherein to fuse the point cloud data with the image data, the controller is further configured to:
   integrate the point cloud data and the image data; and
   detect an object in the environment based on the integrated point cloud data and image data.

4. The receiver of claim 3, wherein the point cloud data comprises a plurality of data points corresponding to the plurality of time points, wherein the image data comprises a plurality of image frames corresponding to the plurality of time points,
   wherein to integrate the point cloud data and the image data, the controller is further configured to:
      determine a specific location of the portion of the micro shutter array that opens at a time point;
      determine a pixel in the image frame of the same time point, wherein the pixel locates at a location in the image frame corresponding to the specific location in the micro shutter array; and
      determine an intensity value of the pixel based on the data point of the point cloud data corresponding to the same time point.

5. The receiver of claim 3, wherein to integrate the point cloud data and the image data, the controller is further configured to augment the point cloud data with color or texture information extracted from the image data.

6. The receiver of claim 1, wherein to fuse the point cloud data with the image data, the controller is further configured to:
   perform a first perception on the point cloud data for detecting an object in the environment;
   perform a second perception on the image data for detecting the object; and
   fuse the first perception and the second perception to detect the object.

7. The receiver of claim 6, wherein the point cloud data is 3D and the image data is 2D, wherein to fuse the first perception and the second perception to detect the object, the controller is further configured to project data of the object detected by the first perception in the 3D point cloud data onto data of the object detected by the second perception in the 2D image data.

8. The receiver of claim 1, wherein to fuse the point cloud data with the image data, the controller is further configured to apply a neural learning network to at least one of the point cloud data or the image data.

9. The receiver of claim 1, wherein the micro shutter array comprises a plurality of micro shutter elements arranged in a two-dimensional array.

10. An optical sensing method, comprising:
    receiving a series of laser beams at a plurality of time points and an ambient light returned from an environment by a micro shutter array disposed along a light path of the series of laser beams returned from the environment, wherein the micro shutter array sequentially opens a portion of the micro shutter array at a specified location at each time point, to allow one of the series of laser beams to pass through the micro shutter array at that time point and to reflect the ambient light by a remaining portion of the micro shutter array at that time point;
    receiving, by a photodetector of the optical sensing system, the series of laser beams passed through sequentially opened portions of the micro shutter array to obtain point cloud data;
    receiving, by an image sensor of the optical sensing system, the ambient light reflected by the micro shutter array to obtain image data; and
    fusing the point cloud data obtained from the photodetector with the image data obtained from the image sensor.

11. The optical sensing method of claim 10, wherein fusing the point cloud data with the image data further comprises:
    integrating the point cloud data and the image data; and
    detecting an object in the environment based on the integrated point cloud data and image data.

12. The optical sensing method of claim 11, wherein the point cloud data comprises a plurality of data points corresponding to the plurality of time points, wherein the image data comprises a plurality of image frames corresponding to the plurality of time points, wherein integrating the point cloud data and the image data further comprises:
    determining a specific location of the portion of the micro shutter array that opens at a time point;
       determining a pixel in the image frame of the same time point, wherein the pixel locates at a location in the image frame corresponding to the specific location in the micro shutter array; and
       determining an intensity value of the pixel based on the data point of the point cloud data corresponding to the same time point.

13. The optical sensing method of claim 11, wherein integrating the point cloud data and the image data further comprises augmenting the point cloud data with color or texture information extracted from the image data.

14. The optical sensing method of claim 10, wherein fusing the point cloud data with the image data further comprises:
  performing a first perception on the point cloud data for detecting an object in the environment;
  performing a second perception on the image data for detecting the object; and
  fusing the first perception and the second perception to detect the object.

15. The optical sensing method of claim 14, wherein the point cloud data is 3D and the image data is 2D, wherein fusing the first perception and the second perception to detect the object further comprises projecting data of the object detected by the first perception in the 3D point cloud data onto data of the object detected by the second perception in the 2D image data.

16. The optical sensing method of claim 10, wherein fusing the point cloud data with the image data further comprises applying a neural learning network to at least one of the point cloud data or the image data.

17. A controller for optical sensing, comprising:
  a communication interface configured to receive point cloud data from a photodetector and image data from an image sensor, wherein the point cloud data is formed by a series of laser beams returned from an environment that pass through a micro shutter array at a plurality of time points and detected by the photodetector, wherein the image data is formed by ambient light reflected by the micro shutter array; and
  a processor configured to fuse the point cloud data with the image data to detect an object in the environment, wherein to fuse the point cloud data with the image data, the processor is further configured to project data of the object detected based on the point cloud data onto data of the object detected based on the image data.

18. The controller of claim 17, wherein the micro shutter array sequentially opens a portion of the micro shutter array at a specified location at each time point, to allow a respective laser beam to pass through the micro shutter array at that time point and to reflect the ambient light by a remaining portion of the micro shutter array at that time point.

19. The controller of claim 17, wherein to fuse the point cloud data with the image data, the processor is further configured to:
  integrate the point cloud data and the image data; and
  detect the object in the environment based on the integrated point cloud data and image data.

20. The controller of claim 17, wherein to fuse the point cloud data with the image data, the processor is further configured to:
  perform a first perception on the point cloud data for detecting the object in the environment;
  perform a second perception on the image data for detecting the object; and
  fuse the first perception and the second perception to detect the object.

* * * * *